United States Patent
Oh et al.

[11] Patent Number: 6,069,721
[45] Date of Patent: May 30, 2000

[54] RADIO FREQUENCY CONTROL CIRCUIT OF BASE STATION OF MOBILE COMMUNICATIONS SYSTEMS

[75] Inventors: Young Ju Oh; Dae Weon Kim, both of Kyungki-do, Rep. of Korea

[73] Assignee: LG Information & Communications, Ltd., Seoul, Rep. of Korea

[21] Appl. No.: 08/974,455

[22] Filed: Nov. 20, 1997

[30] Foreign Application Priority Data

Nov. 21, 1996 [KR] Rep. of Korea ..................... 96/56064

[51] Int. Cl.[7] .................................................. H04B 10/00
[52] U.S. Cl. .......................................... 359/145; 359/167
[58] Field of Search ................................... 359/145–146, 359/167, 173; 455/403, 422

[56] References Cited

U.S. PATENT DOCUMENTS 5,457,557  10/1995  Zarem et al. .......................... 359/121
5,493,436   2/1996  Karasawa et al. ..................... 359/145
5,689,355  11/1997  Okubo et al. .......................... 359/179
5,838,474  11/1998  Stilling ................................... 359/173

*Primary Examiner*—Kinfe-Michael Negash
*Attorney, Agent, or Firm*—Fleshner & Kim

[57] ABSTRACT

The radio frequency control circuit of the base station of a mobile communications system is constructed in a manner that the transmitting coupler branching the transmission signal to the shadow region is connected between the transmitting side power amplifier and transmitting antenna, and the receiving coupler inserting the signal received from the shadow region is connected between the receiving side low noise amplifier and splitter, to cover the shadow region using a simplified circuit configuration without a separate hardware. Therefore, a signal is transmitted by the optical antenna to a shadow region located at a long distance through the optical cable, and the signal is transmitted by the dispersion antenna to a shadow region located at close range through the coaxial cable, to provide radiocommunication service to a mobile located in the shadow region without establishing a base station in the shadow region.

5 Claims, 2 Drawing Sheets

RADIO FREQUENCY CONTROL CIRCUIT OF BASE STATION OF MOBILE COMMUNICATIONS SYSTEMS

BACKGROUND OF THE INVENTION

1. Field of the Invention

The present invention relates to a CDMA mobile communications system, specifically, to a radio frequency control circuit of a base station of a mobile communications system, which provides call service to a mobile located in a shadow region without establishing a base station in the shadow region.

2. Discussion of Related Art

The radio frequency circuit of a base station of a conventional mobile communications system, as shown in FIG. 1, includes a combiner 1 for receiving carrier signals FA1, FA2, . . . , FAn having the same frequency, which are digital signals modulated, combining them, a power amplifier 2, connected to combiner 1, for amplifying the combined carrier signal, a transmitting antenna 3, connected to power amplifier 2, for radiating the amplified high-power carrier signal toward a communication area, a receiving antenna 4 for receiving a signal sent from a subscriber's mobile, a low noise amplifier 5, connected to receiving antenna 4, for amplifying the received signal with low noise, and a splitter 6 for splitting the amplified signal by frequency allocations. Power amplifier 2 may be configured of a linear power amplifier or high power amplifier.

The operation of the radio frequency circuit of the base station of the conventional mobile communications system is explained below. First, transmission process is performed in a manner that a signal combined with carrier signals FA1, . . . , FAn by combiner 1 is amplified by power amplifier 2, and transmitted to a mobile located in an area other than the shadow region through transmitting antenna 3. The reception procedure is executed in a manner that a radio frequency signal is received from the mobiles located in the area other than the shadow region through receiving antenna 4, amplified by low noise amplifier 5, sent to splitter 6, and inputted to combiner 1 as a carrier signal.

With the radio frequency control circuit of the base station in the conventional mobile communications system, the carrier signal radiated from the transmitting antenna or antenna of the subscriber's mobile is in radio frequency band so that its wavelength is short. This produces the shadow region where the carrier signal cannot be transmitted and received. There are underground, tunnel and the inside of a skyscraper as examples of the shadow region. The shadow region widens as the carrier frequency becomes higher.

Accordingly, the conventional radio frequency circuit cannot provide call service to mobiles located in the shadow region. Furthermore, in order to supply the call service to a subscriber in the shadow region, the base station having the radio frequency circuit must be established each shadow region.

SUMMARY OF THE INVENTION

Accordingly, the present invention is directed to a radio frequency control circuit of a base station of a mobile communications system that substantially obviates one or more of the problems due to limitations and disadvantages of the related art.

An object of the present invention is to provide a radio frequency control circuit of a base station of a mobile communications system, which provides call service to a mobile located in a shadow region without establishing a base station in the region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a radio frequency control circuit of a base station of a mobile communications system comprises a transmitting coupler for branching a high-power carrier signal in transmission process, the transmitting coupler being connected between a transmitting side power amplifier and transmitting antenna; a receiving coupler for inserting a receiving signal in reception process, the receiving coupler being connected between a receiving side splitter and low noise amplifier; an optical antenna interface for performing mutual conversion between an electrical signal and optical signal in the transmission/reception process of carrier signal, the optical antenna interface being connected to the transmitting and receiving couplers; an optical antenna section connected to the optical antenna interface in a radial manner, the optical antenna section including a plurality of optical antennas; and a dispersion antenna section correspondingly connected to the optical antenna section, the dispersion antenna section including a plurality of dispersion antennas.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 is a block diagram of a radio frequency circuit of a base station in a conventional mobile communications system; and FIG. 2 is a block diagram of a radio frequency control circuit of a base station in a mobile communications system according to the present invention.

DETAILED DESCRIPTION OF PREFERRED EMBODIMENT

Reference will now be made in detail to the preferred embodiments of the present invention, examples of which are illustrated in the accompanying drawings.

Figure 1:
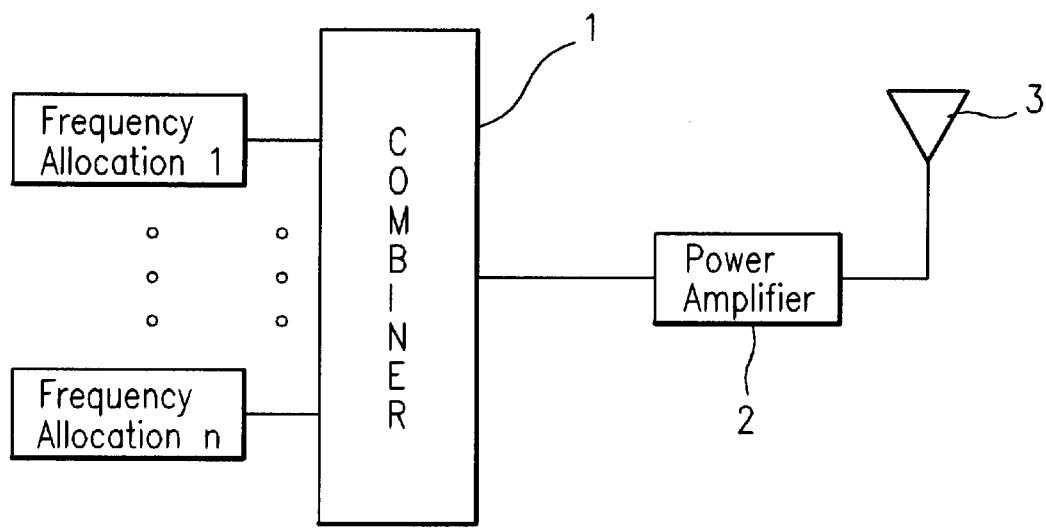
Figure 1:
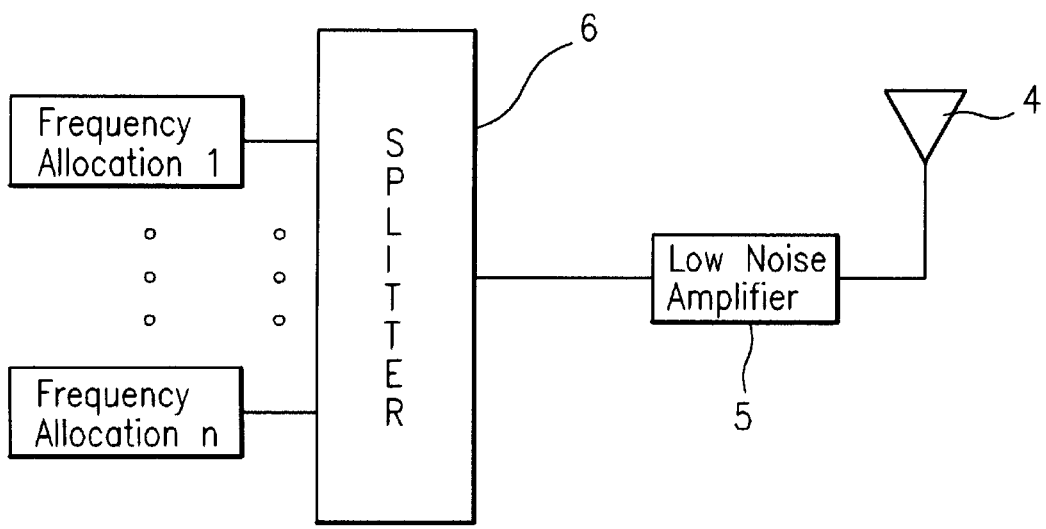
Figure 2:
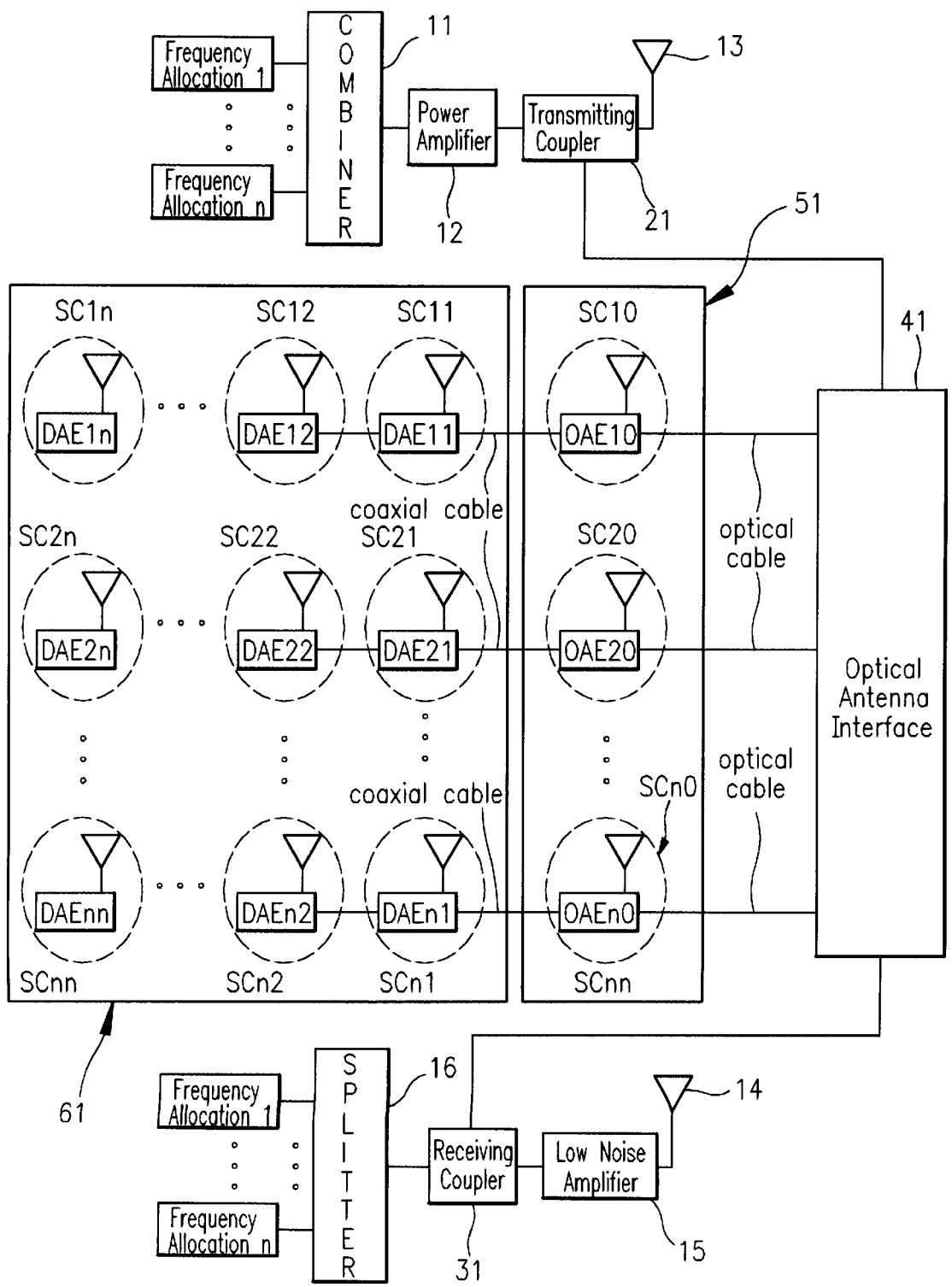

FIG. 2 is a block diagram of a radio frequency control circuit of a base station in a mobile communications system according to the present invention. Referring to FIG. 2, the radio frequency control circuit of the present invention includes: a combiner 11 for receiving carrier signals having the same frequency, which are digital signals modulated, and combining them; a power amplifier 12 for amplifying the carrier signal combined by combiner 11; a transmitting antenna 13 for radiating the high-power carrier signal amplified by power amplifier 12 toward a communication area; a receiving antenna 14 for receiving a signal transmitted from a subscriber's mobile; a low noise amplifier 15 for low-noise amplifying the signal received by receiving antenna 14; a splitter 16 for splitting the low-noise amplified signal and outputting it by frequency allocations; a transmitting coupler 21, connected between power amplifier 12 and transmitting antenna 13, for branching a transmitting signal in transmission procedure; a receiving coupler 31, connected between splitter 16 and low noise amplifier 15, for inserting a receiving signal from the mobile in reception process; an optical antenna interface 41, connected to transmitting and receiving couplers 21 and 31, for carrying out mutual conversion between an electrical signal and optical signal in transmission/reception process; an optical antenna section 51, connected to optical antenna interface 41 in a radial manner through an optical cable, including a plurality of optical antennas established in a shadow region located at a long distance; and a dispersion antenna section 61 including multi stages of dispersion antennas, which is correspondingly connected to optical antenna section 51 through a coaxial cable and amplifies a signal as much as line loss, and radiates the amplified power through a low power antenna.

Each of the plurality of optical antennas converts an optical signal received from optical antenna interface 41 into a radio frequency of electrical signal, and radiates the electrical signal through its low power antenna in the transmission process. During reception procedure, each optical antenna converts a radio frequency signal received from its low power antenna or dispersion antenna into an optical signal, and sends the optical signal to optical antenna interface 41. The dispersion antenna, connected to the optical antenna through the coaxial cable, amplifies a signal received from the optical antenna as much as line loss, radiates the amplified signal through its low power antenna, branches a part of the signal, amplifies the branched signal to a predetermined level, and sends it to the following stage of dispersion antenna, in transmission process. When reception process, the dispersion antenna gain-controls a radio frequency signal received through its low power antenna or following stage of dispersion antenna to a predetermined level, and sends it to the optical antenna.

Combiner 11 receives carrier signals FA1, ..., FAn having the same frequency, which are digital signals modulated, combines them. The carrier signal combined by combiner 11 is amplified by power amplifier 12. High-power carrier signal amplified by power amplifier 12 is radiated toward a communication area by the use of transmitting antenna 13. A signal transmitted from a subscriber's mobile is received by receiving antenna 14. The signal received by receiving antenna 14 is amplified by low noise amplifier 15, and this amplified signal is split by splitter 16.

Transmitting coupler 21 connected between power amplifier 12 and transmitting antenna 13 branches a signal to be transmitted in the transmission process, and receiving coupler 31 connected between splitter 16 and low noise amplifier 15 inserts a signal received by a mobile in the reception process. Optical antenna interface 41 connected to transmitting coupler 21 and receiving coupler 31 converts a radio frequency signal received from transmitting coupler 21 into an optical signal in the transmission procedure. During the reception process, optical antenna interface 41 converts an optical signal into a radio frequency electrical signal and sends it to receiving coupler 31.

Optical antennas OAE10, OAE20, ..., OAEn0 of optical antenna section 51, radially connected to optical antenna interface 41 through the optical cables, are established in shadow regions SC10, SC20, ..., SCn0 which are located at a long distance. The optical antennas convert the optical signal received from optical antenna interface 41 into a radio frequency electrical signal, radiate it through their low power antennas, branch a part of the radio frequency electrical signal and send the branched signal to dispersion antennas DAE11, DAE21, ..., DAEn1, in the transmission process. The optical antennas convert a radio frequency signal received from their low power antennas or dispersion antennas into an optical signal, and output it to optical antenna interface 41.

The dispersion antennas of dispersion antenna section 61 are connected to optical antennas OAE10, OAE20, ..., OAEn0 of optical antenna section 51 through the coaxial cables, and established in shadow regions SC11, SC21, ..., SCn1 located at close range. Dispersion antenna section 61 amplifies a signal received from multiple optical antennas OAE10, OAE20, ..., OAEn0 as much as line loss, radiates it through its low power antenna, branches a part of the signal, amplifies the branched signal to pa predetermined level, and sends it to following stage of dispersion antennas DAE11, DAE21, ..., DAEn1 in the transmission process. Dispersion antennas DAE11, DAE21, ... DAEn1 of Dispersion antenna section 61 gain-control a radio frequency signal, received by their low power antennas or following stage of dispersion antennas DAE12, DAE22, ... DAEn2, to a predetermined level, and send the gain-controlled signal to optical antennas OAE10, OAE20, ..., OAEn0 in the reception process.

Preceding stage of dispersion antennas DAE11, DAE21, ..., DAEn1 are respectively connected to following stage of dispersion antennas DAE12, DAE22, ..., DAEn2 through the coaxial cables, and the dispersion antennas are established in shadow regions SC12, ..., SC1-n; SC22, ..., SC2n-1; ...,; SCn2, ..., SCnn-1. In the transmission process, dispersion antennas DAE12, DAE13, ..., DAE1n-1; DAE22, DAE23, ..., DAE2n-1; DAEn2, DAEn3, ..., DAEnn-1 amplify the signal transmitted from the preceding stage of dispersion antennas as much as line loss, radiate the amplified signal through their low power antenna, branch a part of the signal, and amplify it to a predetermined level. They also amplify a signal received from the following dispersion antennas as much as line loss and send it to the preceding stage of dispersion antennas.

Dispersion antennas DAE1n-1, DAE2n-1, ..., DAEnn-1 are connected to their preceding dispersion antennas through the coaxial cables, and located in shadow regions SC1n-1, SC2n-1, ..., SCnn-1 at close range. Dispersion antennas DAE1n-1, DAE2n-1, ..., DAEnn-1 amplify a signal received as much as line loss, and radiate the amplified signal through their low power antennas in the transmission process, and respectively send a radio frequency signal received from their low power antennas to dispersion antennas DAE1n, DAE2n, ..., DAEnn in the reception process. Here, the transmission means a procedure transmitting a signal from the radio frequency circuit to a mobile located in the shadow region, and reception means a procedure transmitting a signal from the mobile in the shadow region to the radio frequency circuit. The preceding and following stages represent the order of location of the optical antennas and dispersion antennas, based on the optical antenna interface.

The operation of the radio frequency control circuit of the base station of a mobile communications system according to the present invention is explained below. Here, since the communication process between a mobile located in an area other than the shadow region and the base station is the same as that in the conventional system, only communication process between the mobile in the shadow region and base station is explained.

In transmission process, a signal amplified by power amplifier 12 is sent to transmitting antenna 13, and a part of the signal is branched by transmitting coupler 21. Optical antenna interface 41 converts the radio frequency signal received from transmitting coupler 21 into an optical signal, and sends it to each of multiple optical antennas OAE10, OAE20, . . . , OAEn0. Multiple optical antennas OAE10, OAE20, . . . , OAEn0 convert the received optical signal into a radio frequency electrical signal, and send it to each of despersion antennas DAE11, DAE21, . . . , DAE1n which radiate the radio frequency signal through their low power antennas, amplify a part of the signal, and send the amplified signal to the following stage of dispersion antennas. Final stage of dispersion antennas DAE1n, DAE2n, . . . , DAEnn receive the signal from the preceding dispersion antennas, and radiate it through their low power antennas.

In reception process, the radio frequency signal received from each dispersion antenna sequentially passes through preceding dispersion antennas, finally reaches dispersion antennas DAE11, DAE21, . . . , DAEn1 which send the received radio frequency signal to optical antennas OAE10, OAE20, . . . , OAEn0. Optical antennas OAE10, OAE20, . . . , OAEn0 convert the radio frequency signal sent from dispersion antennas DAE11, DAE21, . . . , DAEn1 or their low power antennas into an optical signal and send it to optical antenna interface 41. Optical antenna interface 41 converts the received optical signal into a radio frequency electrical signal and sends it to receiving coupler 31 which inserts the radio frequency electrical signal into the receiving signal, and then sends it to splitter 16.

As described above, the radio frequency control circuit of the base station of a mobile communications system of the present invention is constructed in a manner that the transmitting coupler branching the transmission signal to the shadow region is connected between the transmitting side power amplifier and transmitting antenna, and the receiving coupler inserting the signal received from the shadow region is connected between the receiving side low noise amplifier and splitter, to cover the shadow region using a simplified circuit configuration without a separate hardware. According to the present invention, therefore, a signal is transmitted by the optical antenna to a shadow region located at a long distance through the optical cable, and the signal is transmitted by the dispersion antenna to a shadow region located at close range through the coaxial cable, to provide radio-communication service to a mobile located in the shadow region without establishing a base station in the shadow region.

It will be apparent to those skilled in the art that various modifications and variations can be made in the radio frequency control circuit of a base station of a mobile communications system of the present invention without departing from the spirit or scope of the invention. Thus, it is intended that the present invention cover the modifications and variations of this invention provided they come within the scope of the appended claims and their equivalents.

What is claimed is:

1. A radio frequency control circuit of a base station of a mobile communications system, comprising:

a transmitting coupler for branching a high-power carrier signal in transmission process, the transmitting coupler being connected between a transmitting side power amplifier and transmitting antenna;

a receiving coupler for inserting a receiving signal in reception process, the receiving coupler being connected between a receiving side splitter and low noise amplifier;

an optical antenna interface for performing mutual conversion between an electrical signal and optical signal in the transmission/reception process of carrier signal, the optical antenna interface being connected to the transmitting and receiving couplers;

an optical antenna section connected to the optical antenna interface in a radial manner, the optical antenna section including a plurality of optical antennas; and a dispersion antenna section correspondingly connected to the optical antenna section, the dispersion antenna section including a plurality of dispersion antennas.

2. The circuit as claimed in claim 1, wherein the optical antenna interface and optical antenna section are connected to each other through an optical cable.

3. The circuit as claimed in claim 1, wherein the optical antenna section is located in a shadow region at close range, and dispersion antenna section is located in a shadow region in a long distance.

4. The circuit as claimed in claim 1, wherein the optical antenna section and dispersion antennas section are connected to each other through a coaxial cable.

5. The circuit as claimed in claim 1, wherein the dispersion antenna section amplifies the power of a radio frequency signal as much as line loss, and radiates it through a low power antenna.

* * * * *